(12) United States Patent
Pearce et al.

(10) Patent No.: US 9,953,634 B1
(45) Date of Patent: Apr. 24, 2018

(54) PASSIVE TRAINING FOR AUTOMATIC SPEECH RECOGNITION

(71) Applicant: Knowles Electronics, LLC, Itasca, IL (US)

(72) Inventors: David Pearce, Sunnyvale, CA (US); Brian Clark, San Jose, CA (US)

(73) Assignee: Knowles Electronics, LLC, Itasca, IL (US)

( * ) Notice: Subject to any disclaimer, the term of this patent is extended or adjusted under 35 U.S.C. 154(b) by 182 days.

(21) Appl. No.: 14/573,846

(22) Filed: Dec. 17, 2014

Related U.S. Application Data (60) Provisional application No. 61/917,079, filed on Dec. 17, 2013.

(51) Int. Cl.
*G10L 15/06* (2013.01)

(52) U.S. Cl.
CPC .................. *G10L 15/063* (2013.01)

(58) Field of Classification Search
CPC ..................................... G10L 15/063
See application file for complete search history.

(56) References Cited

U.S. PATENT DOCUMENTS

| | | |
|---|---|---|
| 3,946,157 A | 3/1976 | Dreyfus |
| 4,797,924 A | 1/1989 | Schnars et al. |
| 4,813,076 A | 3/1989 | Miller |
| 5,054,085 A | 10/1991 | Meisel et al. |
| 5,214,707 A | 5/1993 | Fujimoto et al. |
| 5,340,316 A | 8/1994 | Javkin et al. |
| 5,640,490 A | 6/1997 | Hansen et al. |
| 5,787,414 A | 7/1998 | Miike et al. |
| 6,018,708 A | 1/2000 | Dahan et al. |
| 6,067,517 A | 5/2000 | Bahl et al. |

(Continued)

FOREIGN PATENT DOCUMENTS

| | | |
|---|---|---|
| WO | 2014063104 A2 | 4/2014 |
| WO | 2014172167 A1 | 10/2014 |

OTHER PUBLICATIONS

International Search Report & Written Opinion dated Apr. 29, 2014 in Patent Cooperation Treaty Application No. PCT/US2013/065765, filed Oct. 18, 2013.

(Continued)

*Primary Examiner* — Qian Yang
(74) *Attorney, Agent, or Firm* — Foley & Lardner LLP (57) ABSTRACT

Provided are methods and systems for passive training for automatic speech recognition. An example method includes utilizing a first, speaker-independent model to detect a spoken keyword or a key phrase in spoken utterances. While utilizing the first model, a second model is passively trained to detect the spoken keyword or the key phrase in the spoken utterances using at least partially the spoken utterances. The second, speaker dependent model may utilize deep neural network (DNN) or convolutional neural network (CNN) techniques. In response to completion of the training, a switch is made from utilizing the first model to utilizing the second model to detect the spoken keyword or the key phrase in spoken utterances. While utilizing the second model, parameters associated therewith are updated using the spoken utterances in response to detecting the keyword or the key phrase in the spoken utterances. User authentication functionality may be provided.

16 Claims, 5 Drawing Sheets

(56) References Cited

U.S. PATENT DOCUMENTS

| | | |
|---|---|---|
| 6,757,652 B1 | 6/2004 | Lund et al. |
| 6,954,745 B2 | 10/2005 | Rajan |
| 7,016,836 B1 | 3/2006 | Yoda |
| 7,219,063 B2 | 5/2007 | Schalk et al. |
| 7,319,959 B1 | 1/2008 | Watts |
| 7,698,133 B2 | 4/2010 | Ichikawa |
| 8,194,880 B2 | 6/2012 | Avendano |
| 8,275,616 B2 | 9/2012 | Jung et al. |
| 8,345,890 B2 | 1/2013 | Avendano et al. |
| 8,355,511 B2 | 1/2013 | Klein |
| 8,405,532 B1 | 3/2013 | Clark et al. |
| 8,447,596 B2 | 5/2013 | Avendano et al. |
| 8,473,287 B2 | 6/2013 | Every et al. |
| 8,538,035 B2 | 9/2013 | Every et al. |
| 8,543,399 B2 | 9/2013 | Jeong et al. |
| 8,712,776 B2 | 4/2014 | Bellegarda et al. |
| 8,718,299 B2 | 5/2014 | Nishimura et al. |
| 8,880,396 B1 | 11/2014 | Laroche et al. |
| 8,903,721 B1 | 12/2014 | Cowan |
| 8,938,394 B1 | 1/2015 | Faaborg et al. |
| 9,143,851 B2 | 9/2015 | Schober |
| 9,185,487 B2 | 11/2015 | Solbach et al. |
| 9,240,182 B2 | 1/2016 | Lee et al. |
| 2002/0041678 A1 | 4/2002 | Basburg-Ertem et al. |
| 2002/0097884 A1 | 7/2002 | Cairns |
| 2002/0138265 A1 | 9/2002 | Stevens et al. |
| 2003/0069727 A1 | 4/2003 | Krasny et al. |
| 2003/0120601 A1 | 6/2003 | Ouye et al. |
| 2003/0161097 A1 | 8/2003 | Le et al. |
| 2003/0173829 A1 | 9/2003 | Zeng |
| 2003/0179888 A1 | 9/2003 | Burnett et al. |
| 2004/0076190 A1 | 4/2004 | Goel et al. |
| 2004/0114772 A1 | 6/2004 | Zlotnick |
| 2005/0060155 A1 | 3/2005 | Chu et al. |
| 2005/0159945 A1 | 7/2005 | Otsuka et al. |
| 2005/0171851 A1 | 8/2005 | Applebaum et al. |
| 2006/0074686 A1 | 4/2006 | Vignoli |
| 2006/0092918 A1 | 5/2006 | Talalai |
| 2006/0100876 A1 | 5/2006 | Nishizaki et al. |
| 2007/0064817 A1 | 3/2007 | Dunne et al. |
| 2007/0081636 A1 | 4/2007 | Shaffer et al. |
| 2007/0154031 A1 | 7/2007 | Avendano et al. |
| 2007/0192877 A1 | 8/2007 | Yoo et al. |
| 2007/0256027 A1 | 11/2007 | Daude |
| 2008/0004875 A1 | 1/2008 | Chengalvarayan et al. |
| 2008/0010057 A1 | 1/2008 | Chengalvarayan et al. |
| 2008/0019548 A1 | 1/2008 | Avendano |
| 2008/0071547 A1 | 3/2008 | Prieto et al. |
| 2008/0181058 A1 | 7/2008 | Hayakawa |
| 2008/0195389 A1 | 8/2008 | Zhang et al. |
| 2009/0024392 A1 | 1/2009 | Koshinaka |
| 2009/0083034 A1 | 3/2009 | Hernandez et al. |
| 2009/0125311 A1 | 5/2009 | Haulick et al. |
| 2009/0146848 A1 | 6/2009 | Ghassabian |
| 2009/0192795 A1 | 7/2009 | Cech |
| 2009/0220107 A1 | 9/2009 | Every et al. |
| 2009/0235312 A1 | 9/2009 | Morad et al. |
| 2009/0238373 A1 | 9/2009 | Klein |
| 2009/0323982 A1 | 12/2009 | Solbach et al. |
| 2010/0082346 A1 | 4/2010 | Rogers et al. |
| 2010/0082349 A1 | 4/2010 | Bellegarda et al. |
| 2010/0121629 A1 | 5/2010 | Cohen |
| 2010/0198598 A1* | 8/2010 | Herbig .................. G10L 17/06 704/240 |
| 2010/0204987 A1 | 8/2010 | Miyauchi |
| 2010/0305807 A1 | 12/2010 | Basir et al. |
| 2010/0324894 A1 | 12/2010 | Potkonjak |
| 2011/0066429 A1 | 3/2011 | Shperling et al. |
| 2011/0145000 A1 | 6/2011 | Hoepken et al. |
| 2011/0218805 A1 | 9/2011 | Washio et al. |
| 2011/0255709 A1 | 10/2011 | Nishimura et al. |
| 2011/0257967 A1 | 10/2011 | Every et al. |
| 2011/0282663 A1 | 11/2011 | Talwar et al. |
| 2011/0293103 A1 | 12/2011 | Park et al. |
| 2011/0307253 A1* | 12/2011 | Lloyd .................... G10L 15/20 704/233 |
| 2012/0010881 A1 | 1/2012 | Avendano et al. |
| 2012/0027218 A1 | 2/2012 | Every et al. |
| 2012/0087211 A1 | 4/2012 | Lee et al. |
| 2013/0211828 A1 | 8/2013 | Gratke et al. |
| 2013/0311184 A1* | 11/2013 | Badavne ............... G10L 15/14 704/250 |
| 2014/0025379 A1 | 1/2014 | Ganapathiraju et al. |
| 2014/0114665 A1 | 4/2014 | Murgia |
| 2014/0233725 A1* | 8/2014 | Kim ...................... H04M 9/08 379/414 |
| 2014/0244273 A1 | 8/2014 | Laroche et al. |
| 2014/0274203 A1 | 9/2014 | Ganong et al. |
| 2014/0274211 A1 | 9/2014 | Sejnoha et al. |
| 2014/0278435 A1 | 9/2014 | Ganong et al. |
| 2014/0288928 A1* | 9/2014 | Penn ..................... G10L 15/16 704/232 |
| 2014/0316783 A1 | 10/2014 | Medina |
| 2014/0348345 A1 | 11/2014 | Furst et al. |
| 2015/0031416 A1 | 1/2015 | Labowicz et al. |
| 2015/0205342 A1 | 7/2015 | Ooi |
| 2016/0077574 A1 | 3/2016 | Bansal et al. |

OTHER PUBLICATIONS

International Search Report & Written Opinion dated Sep. 11, 2014 in Patent Cooperation Treaty Application No. PCT/US2014/033559, filed Apr. 9, 2014.

Hinton, G. et al., "Deep Neural Networks for Acoustic Modeling in Speech Recognition", IEEE Signal Processing Magazine, Nov. 2012, pp. 82-97.

Laroche, Jean et aL, "Noise Suppression Assisted Automatic Speech Recognition", U.S. Appl. No. 12/962,519, filed Dec. 7, 2010.

Medina, Eitan Asher, "Cloud-Based Speech and Noise Processing", U.S. Appl. No. 61/826,915, filed May 23, 2013.

Laroche, Jean et aL, "Adapting a Text-Derived Model for Voice Sensing and Keyword Detection", U.S. Appl. No. 61/836,977, filed Jun. 19, 2013.

Santos, Peter et al., "Voice Sensing and Keyword Analysis", U.S. Appl. No. 61/826,900, filed May 23, 2013.

Murgia, Carlo, "Continuous Voice Sensing", U.S. Appl. No. 61/881,868, filed Sep. 24, 2013.

Klein, David, "Noise-Robust Multi-Lingual Keyword Spotting with a Deep Neural Network Based Architecture", U.S. Appl. No. 14/614,348, filed Feb. 4, 2015.

Sohn, Jongseo et al., "A Statistical Model-Based Voice Activity Detection", IEEE Signal Processing Letters, vol. 6, No. 1, Jan. 1999, pp. 1-3.

Cho, Yong Duk et al., "Analysis and Improvement of a Statistical Model-Based Voice Activity Detector", Yong Duk Cho and Ahmet Kondoz, IEEE Signal Processing Letters, vol. 8, No. 10, Oct. 2001, pp. 276-278.

Gerkmann, Timo et al., "Unbiased MMSE-Based Noise Power Estimation with Low Complexity and Low Tracking Delay", IEEE Transactions on Audio, Speech, and Language Processing, vol. 20, No. 4, May 2012, pp. 1383-1393.

Ephraim, Y. et al., "Speech enhancement using a minimum mean-square error short-time spectral amplitude astimator," IEEE Transactions on Acoustics, Speech, and Signal Processing, vol. ASSP-32, No. 6, Dec. 1984, pp. 1109-1121.

Nasibov, Zaur, "Decision Fusion of Voice Activity Detectors," Apr. 16, 2012, University of Eastern Finland, pp. 8-11. http://cs.uef.fi/sipu/2012_MSc_Nasibov_Zaur.pdf.

* cited by examiner

FIG. 5

PASSIVE TRAINING FOR AUTOMATIC SPEECH RECOGNITION

CROSS-REFERENCE TO RELATED APPLICATIONS

The present application claims the benefit of U.S. Provisional Application No. 61/917,079, filed on Dec. 17, 2013. The present application is related to U.S. patent application Ser. No. 12/860,515, filed Aug. 20, 2010; U.S. patent application Ser. No. 12/962,519, filed Dec. 7, 2010; U.S. Provisional Application No. 61/826,900, filed May 23, 2013; U.S. Provisional Application No. 61/826,915, filed May 23, 2013; and U.S. Provisional Application No. 61/881,868, filed Sep. 24, 2013. The subject matter of the aforementioned applications is incorporated herein by reference for all purposes.

FIELD

The present application relates generally to audio processing and, more specifically, to passive training for automatic speech recognition.

BACKGROUND

Existing Automatic Speech Recognition (ASR) solutions can use either pre-determined speaker-independent models or be trained to a particular individual's voice as speaker-dependent. For the speaker-dependent training, there can be a separate training mode in which the user "actively enrolls" their voice into a system. This active enrollment/training typically requires the user to utter pre-defined and/or user-defined key-words or phrases to be associated with specific commands. The collected utterances are processed to generate a template or model for the speaker's voice. This model is subsequently used in operation of, for example, a mobile device.

However, speaker-dependent training requires users to spend time actively enrolling their voice and does not allow using a system "out of the box." Additionally, existing solutions typically "lock" the training data after a user has uttered a keyword a few times. This results in poor quality of the training due to limited training data.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

Provided are systems and methods for passive training for automatic speech recognition (ASR). According to an example embodiment, a method for passive training for automatic speech recognition includes utilizing a first model to detect a spoken keyword or a key phrase in spoken utterances. The first model can be a speaker-independent model. The method may include passively training a second model, using at least partially the spoken utterances, to detect the spoken keyword or the key phrase in the spoken utterances. In response to substantial completion of the passive training, the method may switch from utilizing the first, speaker-independent model to utilizing the second, passively trained model to detect the spoken keyword or the key phrase in the spoken utterances.

In various embodiments, the second model includes one or more of a deep neural network (DNN), or a convolutional neural network (CNN), or a combination thereof.

In some embodiments, the speaker dependent keyword sensing system includes training data and states associated with the used template and/or model. The training data and states may be preserved in a non-volatile memory once the initial training of the speaker-dependent keyword sensing model is complete. In certain embodiments, if a new utterance is detected or recognized as user keyword by the speaker-dependent model, the new utterance is used to update the training data, and a new set of detection data is generated. Quality and accuracy of the detection of the user keyword improves over time the more the keyword is uttered and detected. Each time the keyword is uttered and detected, there is a possibility that the keyword is mixed with a different type of background and environmental noise, thereby providing additional robustness to the detection.

Other example embodiments of the disclosure and aspects will become apparent from the following description taken in conjunction with the following drawings.

BRIEF DESCRIPTION OF THE DRAWINGS

Embodiments are illustrated by way of example and not limitation in the figures of the accompanying drawings, in which like references indicate similar elements and in which.

DETAILED DESCRIPTION

The present disclosure provides example systems and methods for passive training for automatic speech recognition. In various embodiments of the present disclosure, utterances of a user are collected and used to create models/templates for a new user in a user-passive manner. The created user or speaker-dependent model replaces/takes over the function of the initial (original) speaker-independent model and, optionally, provides additional functionality.

By way of example and not limitation, embodiments of the present disclosure can be practiced on any mobile device configured to receive and process an audio signal. Mobile devices can be portable or stationary. Mobile devices can include: radio frequency (RF) receivers, transmitters, and transceivers; wired and/or wireless telecommunications and/or networking devices; amplifiers; audio and/or video players; encoders; decoders; speakers; inputs; outputs; storage devices; and user input devices. Mobile devices may include inputs such as buttons, switches, keys, keyboards, trackballs, sliders, touch screens, one or more microphones, gyroscopes, accelerometers, global positioning system (GPS) receivers, and the like. Mobile devices may include outputs, such as LED indicators, video displays, touchscreens, speakers, and the like. In some embodiments, mobile devices may be hand-held devices, such as wired and/or wireless remote controls, notebook computers, tablet computers, phablets, smart phones, personal digital assistants (PDAs), media players, mobile telephones, and the like.

The mobile devices may be used in stationary and mobile environments. Stationary environments may include residencies and commercial buildings or structures. Stationary environments include living rooms, bedrooms, home theaters, conference rooms, auditoriums, and the like. For mobile environments, the systems may be moving with a vehicle, carried by a user, or be otherwise transportable.

According to various example embodiments, a method for passive training for automatic speech recognition includes utilizing a first model to detect a spoken keyword or a key phrase in spoken utterances. The first model is a speaker-independent model. The method includes passively training a second model to detect the spoken keyword or the key phrase in the spoken utterances using at least partially the spoken utterances. In some embodiments, the second model is a speaker-dependent model. Upon substantial completion of the training, the example method allows for switching from utilizing the first model to utilizing the second model to detect the spoken keyword or the key phrase in the spoken utterances.

Figure 1:
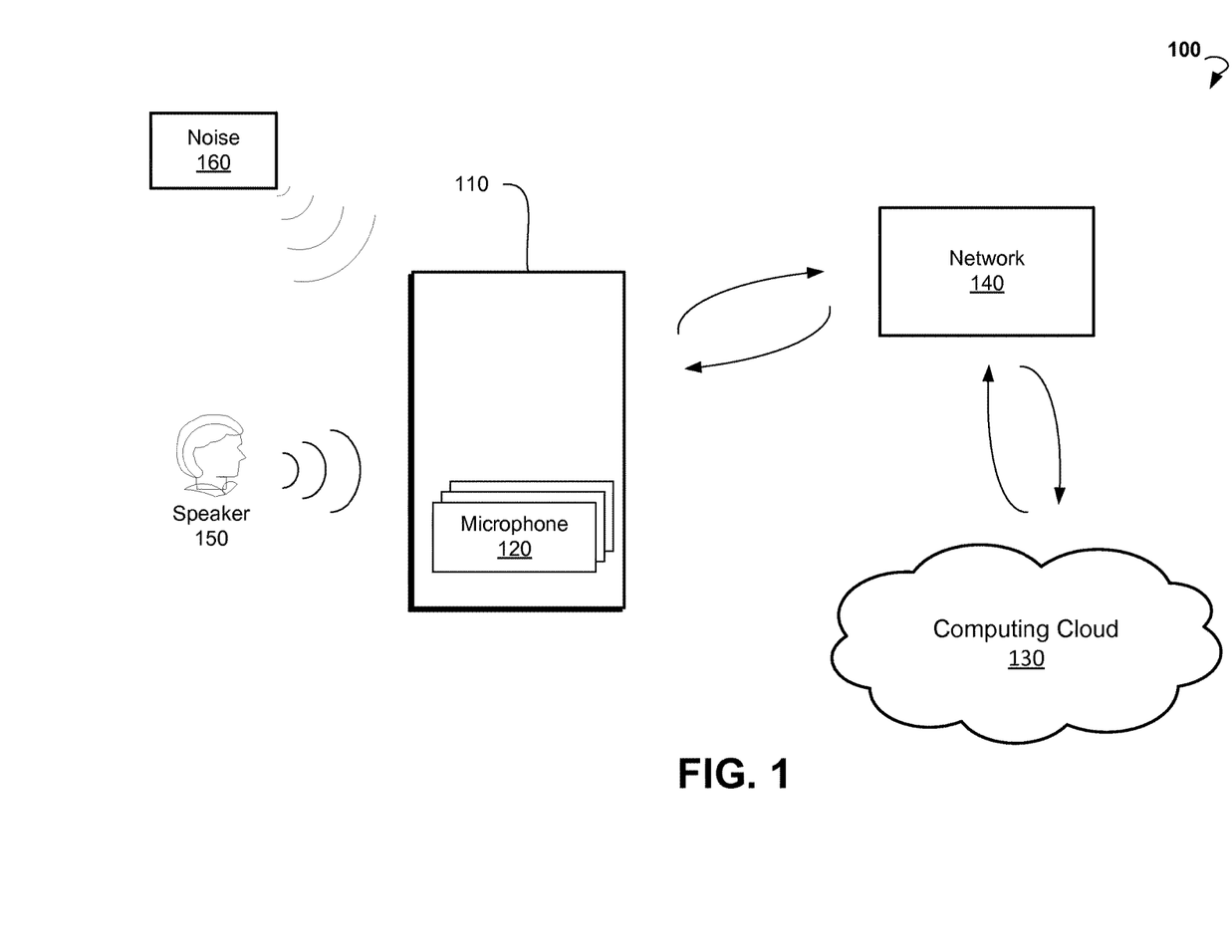
FIG. 1 illustrates an example environment in which a method for passive training for automatic speech recognition can be practiced.

Referring now to FIG. 1, an example environment 100 wherein a method for passive training for automatic speech recognition can be implemented is shown. The example environment 100 includes a mobile device 110, also referred to variously herein as computing device 110. In various embodiments, the mobile device 110 is operable to receive audio signal(s). In some embodiments, the mobile device is operable to receive acoustic sound(s) from a speaker 150. In certain embodiments, the mobile device includes one or more microphones 120 configured to capture the acoustic signal(s). In various embodiments, the mobile device is further operable to process the received acoustic input signal(s) to detect a voice, one or more spoken keyword(s), and so forth.

In various embodiments, the acoustic input signals may be contaminated by a noise 160. Noise is unwanted sound presented in the environment. The noise is detected by, for example, sensors such as microphones 120. In stationary environments, noise sources may include street noise, ambient noise, sound from the mobile device such as audio, speech from entities other than an intended speaker(s), and the like. Mobile environments encounter certain kinds of noise which arise from operation of machines, for example, road, track, tire/wheel, fan, wiper blade, engine exhaust, and so on. The unwanted noise can be caused by sounds due to an entertainment system, communications system, competing speakers, wind, rain, waves, other vehicles, exterior noises, and the like.

In some embodiments, the environment 100 includes one or more cloud-based computing resources, also referred as a computing cloud(s) 130. The cloud-based computing resource(s) 130 can include computing resources (hardware and software) available at a remote location and accessible over a network (for example, the Internet). The cloud-based computing resources 130 can be shared by multiple users and can be dynamically re-allocated based on demand. The cloud-based computing resources 130 may include one or more server farms/clusters including a collection of computer servers that can be co-located with network switches and/or routers. In various embodiments, the computing device 110 can be connected to the computing cloud 130 via one or more wired or wireless communication networks 140.

Figure 2:
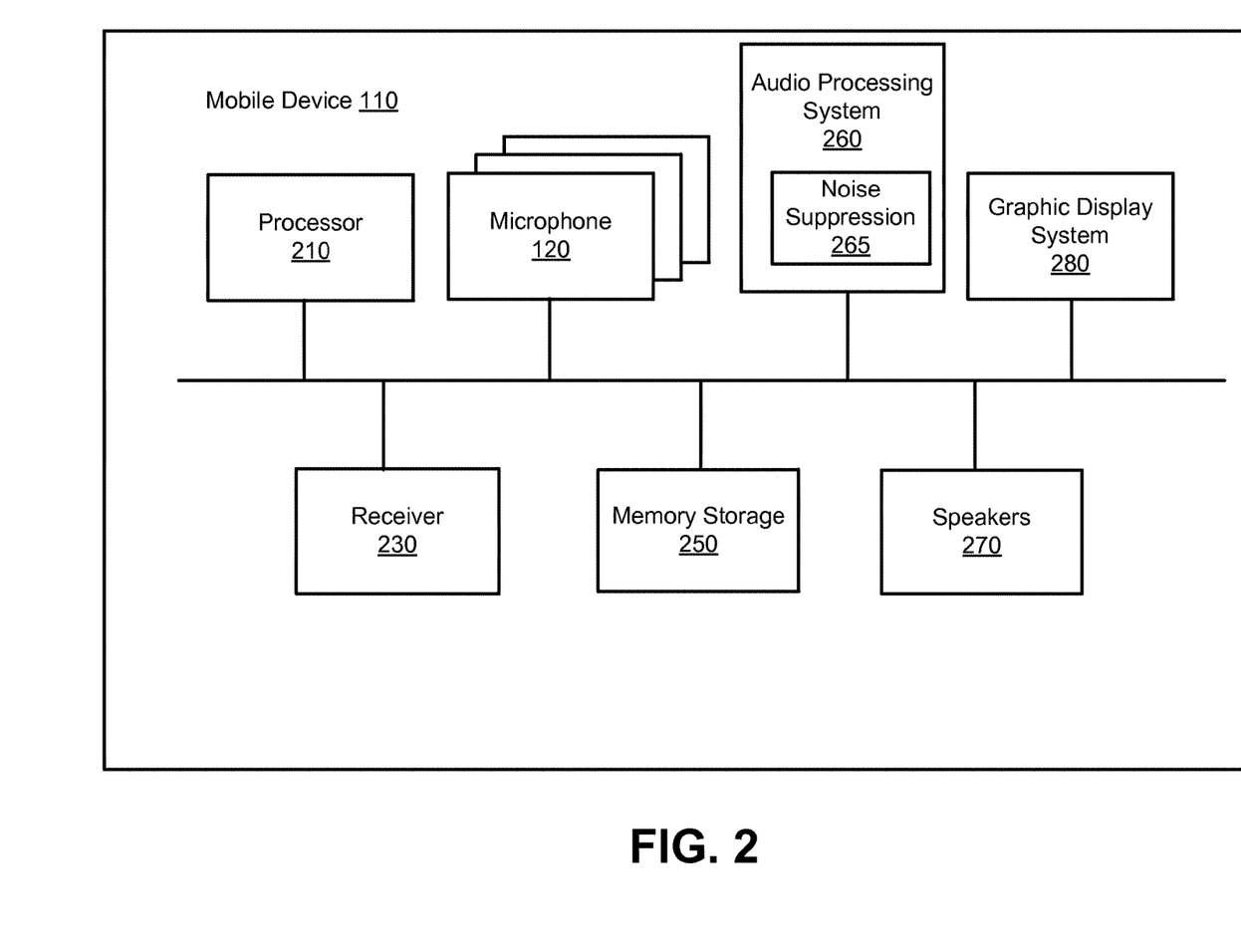
FIG. 2 is a block diagram of a mobile device that can implement a method for passive training for automatic speech recognition, according to various embodiments.

FIG. 2 is a block diagram of a mobile device 110 that can implement a method for passive training for automatic speech recognition, according to an example embodiment. FIG. 2 may provide details of the mobile device 110 of FIG. 1. In the illustrated embodiment, the mobile device 110 includes a processor 210, one or more microphones 120, a receiver 230, memory storage 250, an audio processing system 260, speakers 270, and a graphic display system 280. In other embodiments, the mobile device 110 includes additional or other components that can be used in operation of mobile device 110. Similarly, in some embodiments, the mobile device 110 includes fewer components that perform functions similar or equivalent to those depicted in FIG. 2.

The processor 210 may include hardware and/or software, which is operable to execute computer programs stored, for example in memory storage 250. The processor 210 may use floating point operations, complex operations, and other operations, including passive training, for automatic speech recognition. In some embodiments, the processor 210 may include an Application Processor (AP). In certain embodiments, the AP may be a circuit (for example, dedicated chipset) running an operating system and software applications in the mobile device 110.

In various embodiments, the software applications may include Voice Sense (VS). The VS may include detection of voice commands while a mobile device is in a low power mode. In various embodiments, the software applications include an Automatic Speech Recognition (ASR) module. In some embodiments, both VS and ASR modules can utilize one or more keyword recognition techniques. Embodiments of VS and ASR include modules run as a front end module of an ASR server located either in the mobile device 110 or in the computing cloud 130 (shown in FIG. 1). ASR and VS modules can be used in various applications of the mobile device 110 (for example, mobile device wake up, voice authentication, voice user interface, and so on).

The graphic display system 280 provides a user graphic interface. In some embodiments, a touch screen associated with the graphic display system is utilized to receive an input from a user. The options can be provided to a user via an icon or text buttons once the user touches the screen.

In various embodiments, the audio processing system 260 is operable to receive acoustic signals from an acoustic source via one or more microphones 120 and process the acoustic signal components. The microphones 120 can be spaced a distance apart such that the acoustic waves impinging on the device from certain directions exhibit different energy levels at the two or more microphones. After reception by the microphones 120, the acoustic signals are converted into electric signals. These electric signals, in turn, are converted by an analog-to-digital converter (not shown) into digital signals for processing, in accordance with some embodiments. In some embodiments, the microphones 120 include pulse density modulation (PDM) microphones also referred as digital microphones.

In certain embodiments, where the microphones 120 are omni-directional microphones that are closely spaced (e.g., 1-2 cm apart), a beamforming technique can be used to simulate a forward-facing and backward-facing directional microphone response. A level difference can be obtained using the simulated forward-facing and backward-facing directional microphone. The level difference can be used to discriminate speech and noise in, for example, the time-frequency domain, which can be used in noise and/or echo reduction. In certain embodiments, some microphones 120 are used mainly to detect speech and other microphones are used mainly to detect noise. In other embodiments, some microphones 120 are used to detect both noise and speech.

In some embodiments, in order to suppress the noise, the audio processing system 260 includes a noise suppression module 265. Noise suppression (NS) can be carried out by the audio processing system 260 and noise suppression module 265 of the mobile device 110 based on inter-microphone level difference, level salience, pitch salience, signal type classification, speaker identification, and so forth. By way of example and not limitation, noise reduction methods are described in U.S. Utility patent application Ser. No. 12/215,980, entitled "System and Method for Providing Noise Suppression Utilizing Null Processing Noise Subtraction," filed Jun. 30, 2008, and in U.S. Utility patent application Ser. No. 11/699,732, entitled "System and Method for Utilizing Omni-Directional Microphones for Speech Enhancement," filed Jan. 29, 2007, which are incorporated herein by reference in their entireties.

Figure 3A:
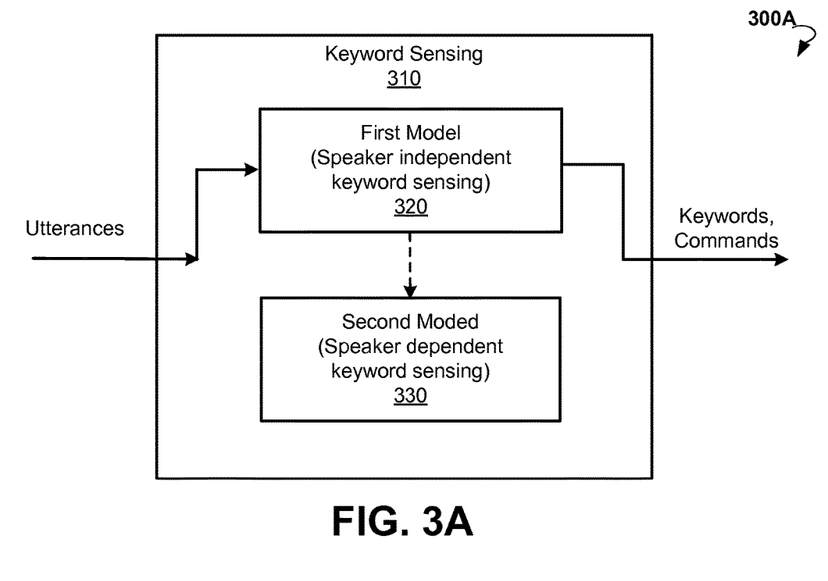
FIG. 3A is a block diagram showing aspects of a system for passive training for automatic speech recognition prior to completion or substantial completion of the passive training, according to an example embodiment.

FIG. 3A is a block diagram showing aspects of an example system 300A for passive training for automatic speech recognition prior to completion of the passive training, according to an example embodiment. The example system 300A includes three modules: keyword sensing 310, a first model (speaker independent keyword sending (model)) 320 and a second model (speaker independent keyword sensing (model)) 330. The keyword sensing module 310 is operable to receive an utterance from a user (a spoken command or phrase) and determine whether the utterance includes a keyword or a key phrase. In response to that determination, the keyword sensing module 310 can pass along the recognized keyword or command for further processing.

In various embodiments, the keyword sensing module 310 includes a speaker-independent keyword sensing model 320. The user is not inconvenienced by active/explicit training/enrollment of the keyword sensing system; therefore, the speaker-independent keyword sensing model 320 may be utilized when the user starts to operate the mobile device "out of the box," with "zero enrollment" (for example, soon after initial activation). "Zero enrollment" as used herein refers variously to the absence of requirement for an enrollment stage. According to various embodiments, the speaker-independent keyword sensing model 320 is a model optimized for use with any speaker, while a speaker-dependent keyword sensing model 330 is another model that is created and trained for use with a particular speaker.

In the process of using the mobile device in normal mode of operation, for example during or after wake-up of the mobile device, the keyword sensing module 310 is operable to simultaneously collect the user's utterance(s). Collection includes sensing the user's/speaker's spoken words and/or phrases (utterances) via one or more microphones of the mobile device. In some embodiments, the utterances received by the microphones are processed with noise suppression, echo cancellation, and so on.

The collected (and optionally processed) utterances are used to create and train a speaker-dependent keyword sensing model 330. The speaker-dependent keyword sensing model 330 can replace the speaker-independent keyword sensing model 320 after the training is complete or substantially complete (see FIG. 3B, for example.) In some embodiments, multiple utterances are collected in a batch mode during mobile device operation and can be used to train the speaker-dependent keyword sensing model 330 in a background process. In this way, the new speaker-dependent keyword sensing model 330 may be passively trained (with zero enrollment). In various embodiments, analysis of the utterances and creation (via passive training) of the speaker-dependent keyword sensing model 330 is processed by the mobile device's computing resources, cloud-based computing resources, or combinations thereof.

Figure 3B:
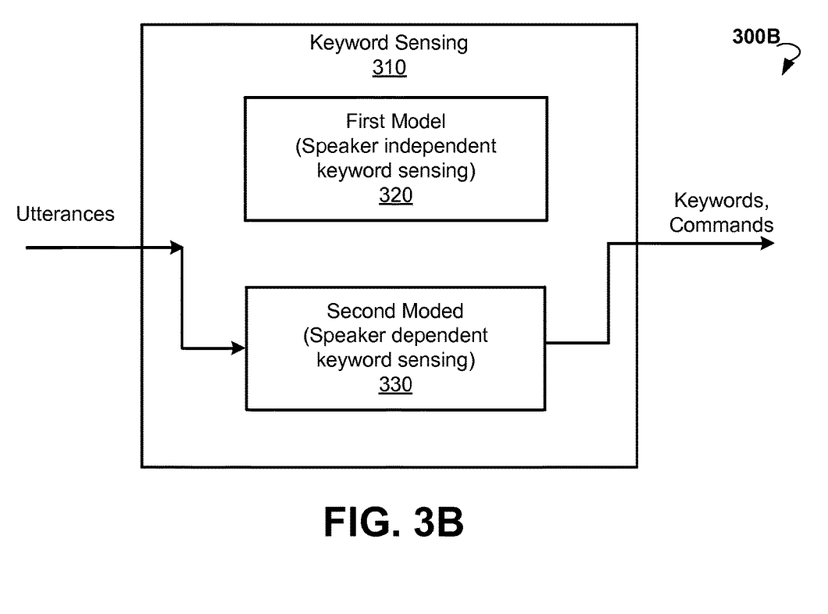
FIG. 3B is a block diagram showing aspects of operation of the exemplary system of FIG. 3A after the passive training has been completed or substantially completed.

FIG. 3B illustrates an example system 300B once the speaker-dependent keyword sensing model 330 is passively trained. In example system 300B, the second model, identified as a speaker-dependent keyword sensing model 330, replaces the initial/original speaker-independent keyword sensing model 320 for purposes of keyword sensing. The functionality of the speaker-independent keyword sensing model 320 is taken over by the speaker-dependent keyword sensing model 330, according to the exemplary embodiment, depicted in FIG. 3B. The example systems 300A and 300B may be integrated into the mobile device 110 (shown on FIG. 1 and FIG. 2).

In some embodiments, the number of utterances collected and used for passive training depends in part on the command(s) and collected utterance(s). In some embodiments, two to twenty utterances are collected. In other embodiments, three or four utterances are collected. In certain embodiments, the collected utterances are sorted to select only the utterances suitable for model/template training according to a pre-determined set of criteria. The set of criteria includes matching to the initial speaker-independent keyword sensing model 320, signal-to-noise ratio (SNR) level of the utterance, duration of the utterance, degree of matching as compared to other captured utterances, and the like.

In some embodiments, the mobile device seamlessly (from the perspective of the user) switches from functioning with a speaker-independent keyword sensing model 320 as a speaker-independent device to functioning, with the new speaker-dependent keyword sensing model 330, as a speaker-dependent device. The switching can be carried out in a passive manner such that the user need not be aware of the switch/transition. After switching to speaker-dependent keyword sensing model 330, the threshold for keyword recognition/sensing can be tightened (so as to increase selectivity) since the performance of the speaker-dependent keyword sensing model 330 is better, and in some instances substantially better, than the speaker-independent keyword sensing model 320.

In some embodiments, the speaker-dependent keyword sensing model 330 offers additional functionality as compared to speaker-independent keyword sensing model 320. In certain embodiments, the additional functionality includes a user authentication. User authentication is determining or confirming the identity of a user. The passively trained speaker-dependent keyword sensing model 330, for example, is used to determine if the speaker is a particular user/speaker associated with the speaker-dependent keyword sensing model 330 (for example, to determine who the user is). Once the identity of the user is authenticated, the user is optionally authorized. Authorization is determining that the identified user has permission to, for example, access and perform certain operations on the mobile device 110.

Various embodiments of the present disclosure provide passive speaker-dependent training without explicit enrollment. The speaker-dependent training is carried out without extra effort from the user in a separate enrollment stage, e.g., zero enrollment. In various embodiments, the collected utterances are used to enroll users for authentication as part of, for example, simultaneous wake-up and authentication functionality, that is without a separate enrollment stage. The absence of requirement for an enrollment stage can be referred as "zero enrollment."

In various embodiments, the speaker-independent keyword sensing model 320 and/or speaker-dependent keyword sensing model 330 include at least one of a deep neural network (DNN) technique and a convolutional neural network (CNN) technique. In some embodiments, one or more other techniques (for example, a Gaussian mixture model, and so forth) may be used. In some embodiments, the speaker dependent keyword sensing system 330 includes training data and states associated with the used template and/or model.

In some embodiments, the training data and states are preserved in a non-volatile memory when the initial training of the speaker-dependent keyword sensing model 330 is complete or substantially complete. In certain embodiments, during further operation of the mobile device, if a new utterance is detected or recognized as user keyword by the speaker-dependent model 330, then the new utterance is used to update the training data. A new set of detection data is generated. Quality and accuracy of the detection of the user keyword improves over time the more the keyword is uttered and detected. Each time the keyword is uttered and detected, there is a possibility that the keyword is mixed with a different type of background and environmental noise, thereby providing additional robustness to the detection.

Figure 4:
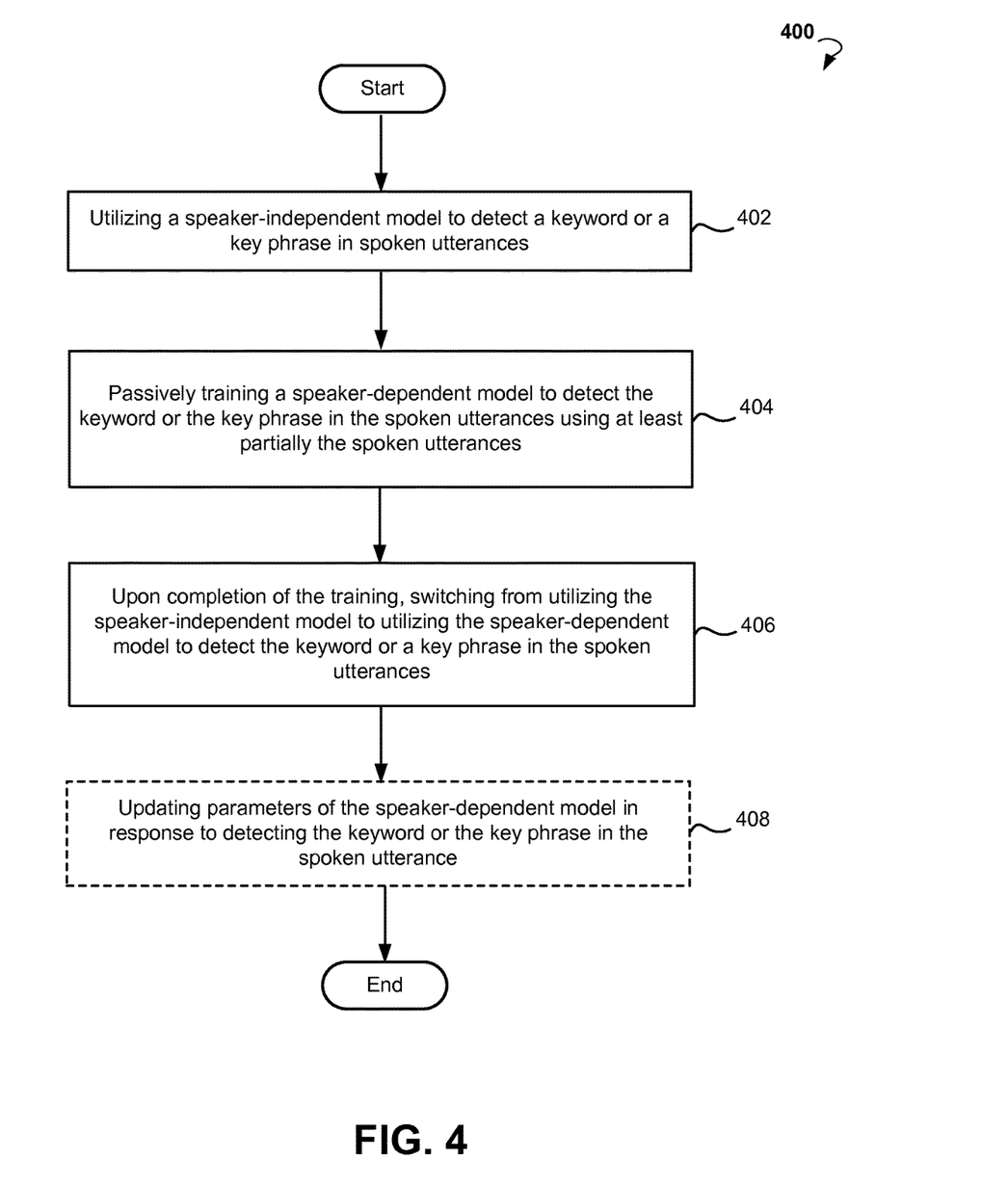
FIG. 4 is a flow chart showing steps of a method for passive training for automatic speech recognition, according to an example embodiment.

FIG. 4 is a flow chart showing steps of a method 400 for passive training for automatic speech recognition, according to an example embodiment. In some embodiments, the method 400 is implemented in the mobile device 110 (shown in FIG. 1 and FIG. 2). At block 402, the illustrated method 400 includes utilizing a speaker-independent model to detect a spoken keyword or a key phrase in spoken utterances. At block 404, the method includes passively training a speaker-dependent model to detect the spoken keyword or the key phrase in the spoken utterances using at least partially the spoken utterances. At block 406, the method includes, upon completing the training, or in response to substantial completion of the training in some embodiments, switching from utilizing the first model to utilizing the second model to detect the spoken keyword or the key phrase in the spoken utterances. At optional block 408, the method optionally includes updating parameters associated with the speaker-dependent model using the spoken utterances in response to detecting the keyword or the key phrase in the spoken utterances.

Figure 5:
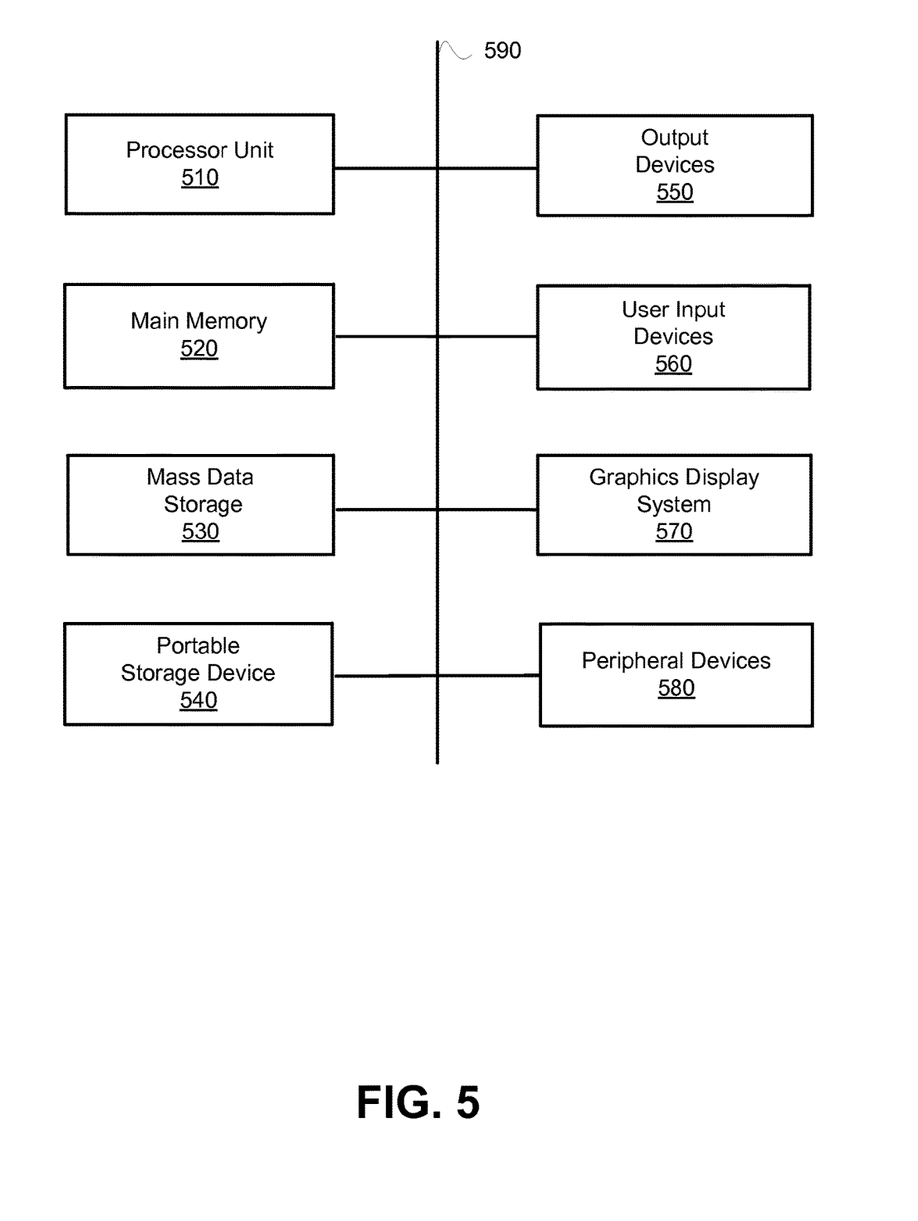
FIG. 5 is an example of a computer system that can be used to implement embodiments of the present disclosure.

FIG. 5 illustrates an exemplary computer system 500 that may be used to implement some embodiments of the present disclosure. The computer system 500 of FIG. 5 may be implemented in the contexts of the likes of computing systems, networks, servers, or combinations thereof. The computer system 500 of FIG. 5 includes one or more processor units 510 and main memory 520. Main memory 520 stores, in part, instructions and data for execution by processor units 510. Main memory 520 stores the executable code when in operation, in this example. The computer system 500 of FIG. 5 further includes a mass data storage 530, portable storage device 540, output devices 550, user input devices 560, a graphics display system 570, and peripheral devices 580.

The components shown in FIG. 5 are depicted as being connected via a single bus 590. The components may be connected through one or more data transport means. Processor unit 510 and main memory 520 are connected via a local microprocessor bus, and the mass data storage 530, peripheral device(s) 580, portable storage device 540, and graphics display system 570 are connected via one or more input/output (I/O) buses.

Mass data storage 530, which can be implemented with a magnetic disk drive, solid state drive, or an optical disk drive, is a non-volatile storage device for storing data and instructions for use by processor unit 510. Mass data storage 530 stores the system software for implementing embodiments of the present disclosure for purposes of loading that software into main memory 520.

Portable storage device 540 operates in conjunction with a portable non-volatile storage medium, such as a flash drive, floppy disk, compact disk (CD), digital video disc (DVD), or Universal Serial Bus (USB) storage device, to input and output data and code to and from the computer system 500 of FIG. 5. The system software for implementing embodiments of the present disclosure is stored on such a portable medium and input to the computer system 500 via the portable storage device 540.

User input devices 560 can provide a portion of a user interface. User input devices 560 may include one or more microphones; an alphanumeric keypad, such as a keyboard, for inputting alphanumeric and other information; or a pointing device, such as a mouse, a trackball, stylus, or cursor direction keys. User input devices 560 can also include a touchscreen. Additionally, the computer system 500 as shown in FIG. 5 includes output devices 550. Suitable output devices 550 include speakers, printers, network interfaces, and monitors.

Graphics display system 570 includes a liquid crystal display (LCD) or other suitable display device. Graphics display system 570 is configurable to receive textual and graphical information and process the information for output to the display device.

Peripheral devices 580 may include any type of computer support device to add additional functionality to the computer system.

The components provided in the computer system 500 of FIG. 5 are those typically found in computer systems that may be suitable for use with embodiments of the present disclosure and are intended to represent a broad category of such computer components that are well known in the art. Thus, the computer system 500 of FIG. 5 can be a personal computer (PC), hand held computer system, telephone, mobile computer system, workstation, tablet, phablet, mobile phone, server, minicomputer, mainframe computer, wearable, or any other computer system. The computer may also include different bus configurations, networked platforms, multi-processor platforms, and the like. Various operating systems may be used including UNIX, LINUX, WINDOWS, MAC OS, PALM OS, QNX ANDROID, IOS, CHROME, TIZEN and other suitable operating systems.

The processing for various embodiments may be implemented in software that is cloud-based. In some embodiments, the computer system 500 is implemented as a cloud-based computing environment, such as a virtual machine operating within a computing cloud. In other embodiments, the computer system 500 may itself include a cloud-based computing environment, where the functionalities of the computer system 500 are executed in a distributed fashion. Thus, the computer system 500, when configured as a computing cloud, may include pluralities of computing devices in various forms, as will be described in greater detail below.

In general, a cloud-based computing environment is a resource that typically combines the computational power of a large grouping of processors (such as within web servers) and/or that combines the storage capacity of a large grouping of computer memories or storage devices. Systems that provide cloud-based resources may be utilized exclusively by their owners or such systems may be accessible to outside users who deploy applications within the computing infrastructure to obtain the benefit of large computational or storage resources.

The cloud may be formed, for example, by a network of web servers that comprise a plurality of computing devices, such as the computer device 500, with each server (or at least a plurality thereof) providing processor and/or storage resources. These servers may manage workloads provided by multiple users (e.g., cloud resource customers or other users). Typically, each user places workload demands upon the cloud that vary in real-time, sometimes dramatically. The nature and extent of these variations typically depends on the type of business associated with the user.

The present technology is described above with reference to example embodiments. Therefore, other variations upon the example embodiments are intended to be covered by the present disclosure.

What is claimed is:

1. A method for passive training for automatic speech recognition, the method comprising:
   maintaining both a first model and a second model that are configured to detect a spoken keyword or a key phrase in spoken utterances, wherein the spoken utterances comprise words and/or phrases spoken by a user;
   utilizing only the first model, the first model being a speaker-independent model, to detect the spoken keyword or the key phrase in spoken utterances until the second model has been trained;
   passively training the second model, using the spoken utterances comprising words and/or phrases spoken by the user, to detect the spoken keyword or the key phrase in the spoken utterances; and
   in response to completion of the passive training, wherein completion requires performing the passive training with a plurality of the spoken utterances satisfying a predetermined set of criteria, switching from utilizing only the first, speaker-independent model to utilizing only the second, passively trained model to detect the spoken keyword or the key phrase in the spoken utterances,
   wherein passively training the second model includes selecting at least one utterance from the spoken utterances comprising words and/or phrases spoken by the user according to at least one predetermined criterion, and wherein the at least one pre-determined criterion includes one or more of a determination that a signal-to-noise ratio level of the selected utterance is below a pre-determined level and a determination that a duration of the selected utterance is below a pre-determined time period.

2. The method of claim 1, wherein the second model is a speaker-dependent model for the user.

3. The method of claim 1, wherein the second model is operable to provide at least one additional functionality different from detecting the spoken keyword or the key phrase.

4. The method of claim 3, wherein the at least one additional functionality includes an authentication of the user.

5. The method of claim 1, wherein the second model includes one or more of the following: a deep neural network (DNN) and a convolutional neural network (CNN).

6. The method of claim 1, wherein a threshold of detecting the keyword or the key phrase by the second model is narrower than a threshold of detecting the keyword or the key phrase by the first model, such that the second model provides substantially more sensitive keyword detection compared to the first model.

7. The method of claim 1, wherein the passive training of the second model completes upon collecting a pre-determined number of the selected at least one utterance.

8. The method of claim 1, further comprising updating parameters associated with the second model using the spoken utterances in response to detecting the keyword or the key phrase in the spoken utterances.

9. A system for passive training for automatic speech recognition, comprising:
   at least one processor; and
   a memory communicatively coupled to the at least one processor, the memory storing instructions which when executed by the at least one processor perform a method comprising:
   maintaining both a first model and a second model that are configured to detect a spoken keyword or a key phrase in spoken utterances, wherein the spoken utterances comprise words and/or phrases spoken by a user;
   utilizing only the first model, the first model being a speaker-independent model, to detect the spoken keyword or the key phrase in spoken utterances until the second model has been trained;
   passively training the second model, using the spoken utterances comprising words and/or phrases spoken by the user, to detect the spoken keyword or the key phrase in the spoken utterances; and
   in response to completion of the passive training, wherein completion requires performing the passive training with a plurality of the spoken utterances satisfying a predetermined set of criteria, switching from utilizing only the first, speaker-independent model to utilizing only the second, passively trained model to detect the spoken keyword or the key phrase in the spoken utterances,
   wherein passively training the second model includes selecting at least one utterance from the spoken utterances comprising words and/or phrases spoken by the user according to at least one predetermined criterion, and wherein the at least one pre-determined criterion includes one or more of a determination that a signal-to-noise ratio level of the selected utterance is below a pre-determined level and a determination that a duration of the selected utterance is below a pre-determined time period.

10. The system of claim 9, wherein the second model is a speaker-dependent model for the user.

11. The system of claim 9, wherein the second model includes one or more of the following: a deep neural network (DNN) and a convolutional neural network (CNN).

12. The system of claim 9, wherein the second model is operable to provide at least one additional functionality different from detecting the spoken keyword or the key phrase.

13. The system of claim 12, wherein the at least one additional functionality includes an authentication of the user.

14. The system of claim 9, wherein a threshold of detecting the keyword or the key phrase by the second model is narrower than a threshold of detecting the keyword or the key phrase by the first model.

15. The system of claim 9, further comprising updating parameters associated with the second model using the spoken utterances in response to detecting the keyword or the key phrase in the spoken utterances.

16. A non-transitory processor-readable medium having embodied thereon a program being executable by at least one processor to perform a method for passive training for automatic speech recognition, the method comprising:

maintaining both a first model and a second model that are configured to detect a spoken keyword or a key phrase in spoken utterances, wherein the spoken utterances comprise words and/or phrases spoken by a user;

utilizing only the first model, the first model being a speaker-independent model, to detect the spoken keyword or the key phrase in spoken utterances until the second model has been trained;

passively training the second model, using the spoken utterances comprising words and/or phrases spoken by the user, to detect the spoken keyword or the key phrase in the spoken utterances; and in response to completion of the passive training, wherein completion requires performing the passive training with a plurality of the spoken utterances satisfying a predetermined set of criteria, switching from utilizing only the first, speaker-independent model to utilizing only the second, passively trained model to detect the spoken keyword or the key phrase in the spoken utterances, wherein passively training the second model includes selecting at least one utterance from the spoken utterances comprising words and/or phrases spoken by the user according to at least one predetermined criterion, and wherein the at least one pre-determined criterion includes one or more of a determination that a signal-to-noise ratio level of the selected utterance is below a pre-determined level and a determination that a duration of the selected utterance is below a pre-determined time period.

* * * * *